US006862816B1

(12) United States Patent
Romer

(10) Patent No.: US 6,862,816 B1
(45) Date of Patent: Mar. 8, 2005

(54) CARD FOLDING TEMPLATE

(76) Inventor: Nicholas K. Romer, 203 Main St., #614, Flemington, NJ (US) 08822

( * ) Notice: Subject to any disclaimer, the term of this patent is extended or adjusted under 35 U.S.C. 154(b) by 0 days.

(21) Appl. No.: 10/739,592

(22) Filed: Dec. 18, 2003

(51) Int. Cl.[7] .............................. G01B 3/14; B31B 1/26
(52) U.S. Cl. ............................ 33/563; 33/562; 493/405
(58) Field of Search .......................... 33/562, 563, 565, 33/566; 493/405, 446, 447, 455, 456

(56) References Cited

U.S. PATENT DOCUMENTS

| | | | | | |
|---|---|---|---|---|---|
| 3,142,906 | A | * | 8/1964 | Mitsos | 33/563 |
| 3,760,506 | A | | 9/1973 | Tudberry | |
| 5,052,118 | A | | 10/1991 | Beitler | |
| 5,058,285 | A | * | 10/1991 | Morita et al. | 33/563 |
| 5,348,526 | A | * | 9/1994 | Feygin | 493/405 |
| 5,509,212 | A | * | 4/1996 | Henricksen | 33/565 |
| 5,626,551 | A | * | 5/1997 | Kearns et al. | 493/231 |
| 5,685,816 | A | * | 11/1997 | Romer | 493/231 |
| 5,842,963 | A | * | 12/1998 | Meesters | 493/405 |
| 6,112,425 | A | * | 9/2000 | Nelson et al. | 33/563 |
| 6,189,226 | B1 | * | 2/2001 | Mascarenas | 33/563 |
| 6,434,844 | B1 | | 8/2002 | Rank | |
| D475,307 | S | | 6/2003 | Grendahl | |
| 6,695,758 | B2 | * | 2/2004 | Dostie | 493/405 |
| 6,708,413 | B2 | * | 3/2004 | Carlson et al. | 33/562 |
| 2001/0047843 | A1 | | 12/2001 | Reinig | |

* cited by examiner

*Primary Examiner*—Christopher W. Fulton
*Assistant Examiner*—Madeline Gonzalez
(74) *Attorney, Agent, or Firm*—Sturm & Fix LLP

(57) ABSTRACT

A method and card folding template (10) for creating card blanks (101) from a sheet of craft paper (100) and forming precise creases (102) (103) to make single and multi-folded cards wherein, the card folding template (10) includes a rectangular template member (20) provided with at least one pair of aperture apexes A—A that are employed to align the captive edge (101') of a card blank (101) prior to folding the free end (101") over the capturing edge (20') of the template member (20).

7 Claims, 2 Drawing Sheets

Fig. 5
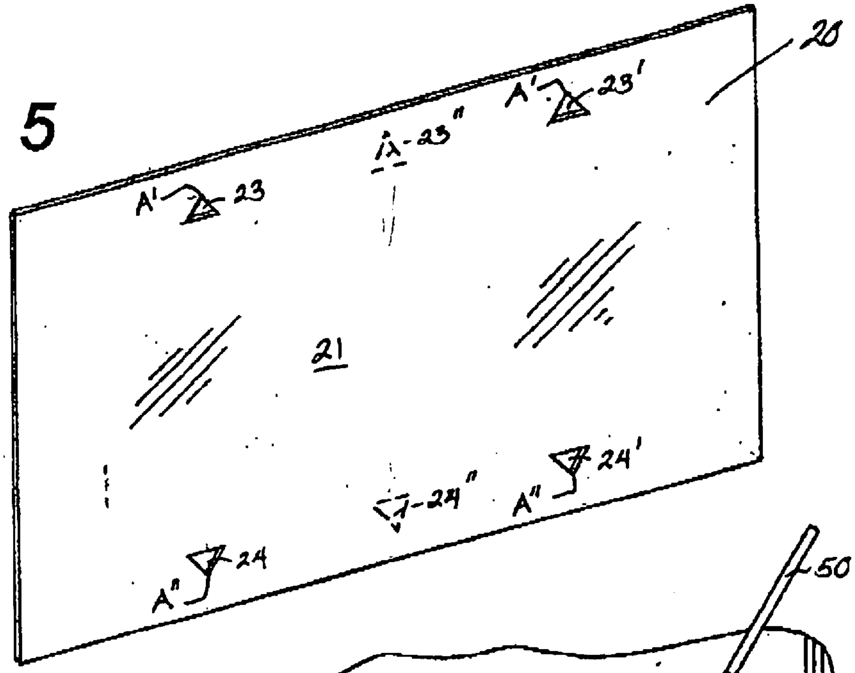
Fig. 6
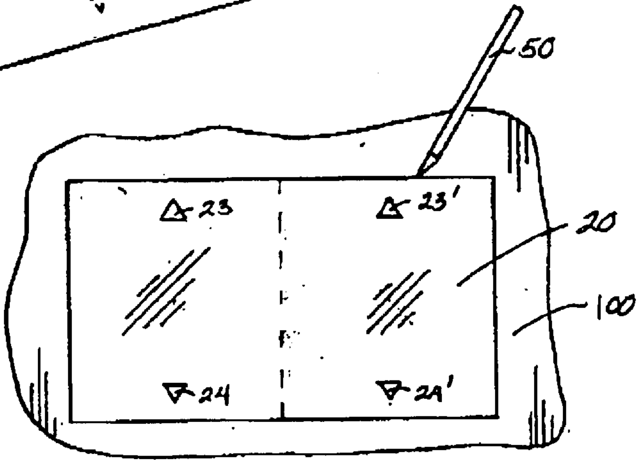
Fig. 7
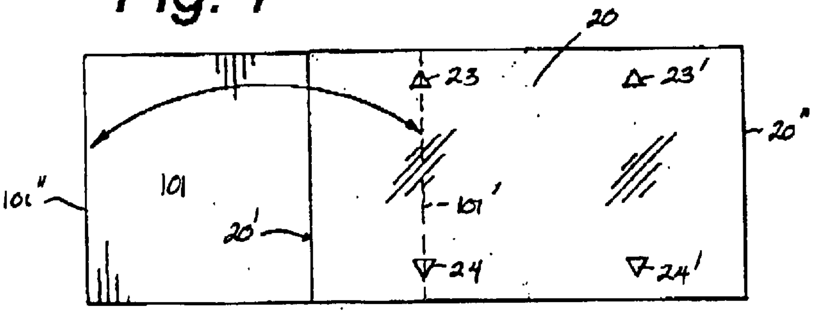
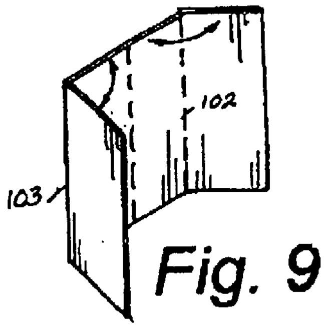
Fig. 9
Fig. 8
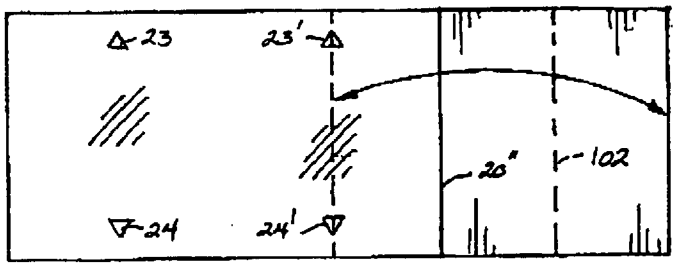

CARD FOLDING TEMPLATE

CROSS REFERENCE TO RELATED APPLICATIONS

Not applicable.

BACKGROUND OF THE INVENTION

1. Field of the Invention

The present invention relates to the field of craft supplies in general and in particular to a card folding template for creating cards from folded paper stock.

2. Description of Related Art

As can be seen by reference to the following U.S. Pat. Nos. 3,760,506; 5,052,118; 6,434,844; 2001/0047843 A1; and D475,307 S, the prior art is replete with myriad and diverse template arrangements and methods of fabricating greeting cards.

While all of the aforementioned prior art constructions are more than adequate for the basic purpose and function for which they have been specifically designed, they are uniformly deficient with respect to their failure to provide a simple, efficient, and extremely practical method and apparatus for fabricating a plurality of folded greeting cards having different fold configurations from standard sized paper stock.

One of the most difficult tasks for crafters to accomplish when creating handmade greeting cards is the ostensibly simple task of creating straight and properly spaced creases in the paper stock that is employed in the card making process so that all of the panels of the folded card have the proper dimensions.

As a consequence of the foregoing situation, there has existed a longstanding need among crafters for a new and improved card folding template that produces straight, crisp fold lines at the proper intervals on paper stock such that the panels of the finished card are of the proper dimensions and configurations; and the provision of such a card folding template is the stated objective of the present invention.

BRIEF SUMMARY OF THE INVENTION

Briefly stated, the card folding template that forms the basis of the present invention comprises a generally rectangular template member fabricated from a sheet of plastic material wherein, the interior surface of the template member is provided with at least one pair of aperture apexes that are positioned such that the captive edge of a sheet of paper card stock that is aligned with both of the apexes is properly positioned such that the free end of the paper card stock may be creased along the capturing edge of the template to produce a perfectly aligned and dimensioned finished greeting card panel.

As will be explained in greater detail further on in the specification, the apex alignment feature of this invention may be incorporated into more than one template member to produce a variety of different folded greeting card configurations. However, the dual apex alignment principle is uniformly maintained in each template version.

Furthermore, this dual apex alignment may be accomplished either by employing a pair of spaced, oppositely facing, aligned triangular apertures and/or an enlarged triangular aperture having vertically aligned apexes.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 5 is a perspective view of the second version of the card folding template that forms the basis of this invention;

FIG. 6 shows the exterior of the second version of the template being used to create another greeting card blank;

FIG. 7 shows the first step required to create a multiple folded greeting card blank;

FIG. 8 shows the second step required to create a dual fold greeting card blank; and, FIG. 9 is a perspective view of the dual fold greeting card blank created by the second version of the template.

DETAILED DESCRIPTION OF THE INVENTION

Figure 1:
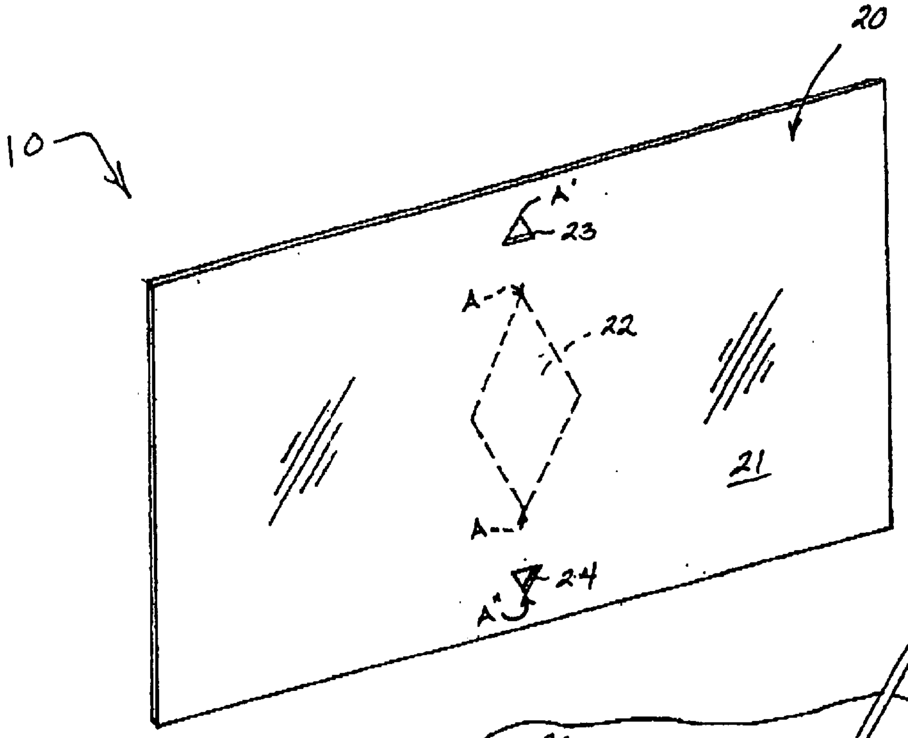
FIG. 1 is a perspective view of the first version of the card folding template that forms the basis of the present invention.

As can be seen by reference to the drawings, and in particular to FIG. 1, the card folding template that forms the basis of the present invention is designated generally by the reference number 10. The card folding template 10 comprises a generally rectangular template member 20 preferably fabricated from a sheet of plastic material 21 wherein, the interior portion of the template member 20 is provided with either a single aperture 22 or a pair of apertures 23 24 having opposed apexes A—A and A'–A" as will be explained presently.

In the first version of the preferred embodiment illustrated in FIG. 1, the single aperture 22 has an elongated diamond shaped configuration wherein, the upper and lower apexes A—A of the single aperture 22 are aligned along the vertical mid-line of the template member 20; and, the pair of apertures 23 24 have oppositely facing triangular configurations wherein, the apexes A'–A" are likewise aligned along the vertical mid-line of the template member 20.

Figure 2:
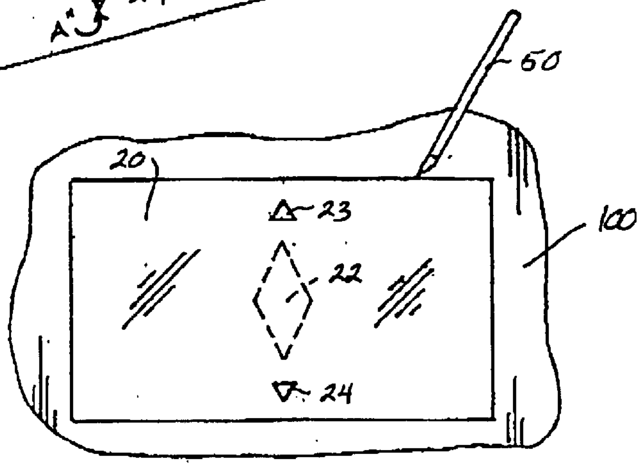
FIG. 2 shows the exterior of the template being used to create a greeting card blank.
Figure 3:
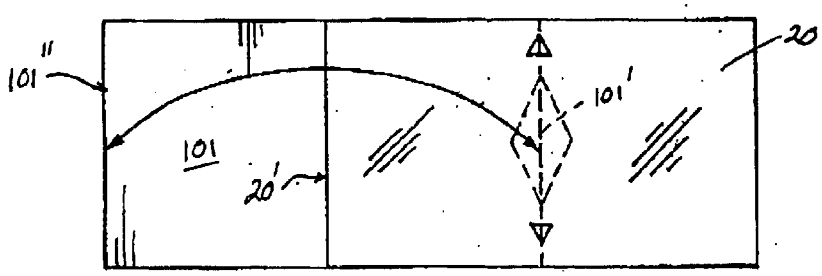
FIG. 3 shows the alignment step required to form a single fold greeting card from the card blank.
Figure 4:
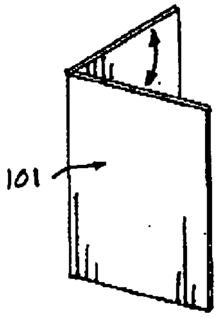
FIG. 4 is a perspective view of the single fold greeting card blank formed by the first version of the template.

Turning now to FIGS. 2 through 4, it can be seen that the exterior periphery of the template member 20 is employed in conjunction with a cutting implement 50 to create a specifically dimensioned card blank 101 from a sheet of craft paper 100. The card blank 101 is then slipped under the template member 20 until the captive edge 101' of the card blank 101 is aligned with a pair of opposed apexes A—A or A'–A" at which point the free end 101" is folded over the capturing edge 20' of the template member 20 to produce the single fold card blank depicted in FIG. 4.

Turning now to FIG. 5, it can be seen that in the second version of the preferred embodiment, the template member 20 is also fabricated from a rectangular sheet of plastic material 21 wherein, in this version, the interior portion of the template member 20 is provided with a plurality of spaced pairs of aligned oppositely facing triangular shaped apertures 23 24 23' 24' each provided with upper A' and lower A" apexes.

In this particular version, the spaced pairs of triangular apertures 23 24 and 23' 24' are equally spaced from both the outer edges 20' 20" and the vertical mid-line (depicted in phantom in FIG. 6) of the template member 20.

As can also be seen by reference to FIG. 6, the outer periphery of the template member 20 is emphasized in conjunction with a cutting implement 50 to create a card blank 101 from a sheet of craft paper 100 as previously described.

Furthermore, as depicted in FIGS. 7 through 9, the card blank 101 is slid under the template member 20 until the captive edge 101' is aligned with the apexes of one of the pairs 23 24 of triangular apertures wherein, the free edge 101" is folded over the captive edge 20' of the template member to create the first card crease 102. The template member 20 is then slid over the card blank 101 to align the apexes of the second pair of triangular apertures 23' 24' with the formerly free edge 101" of the card blank 101 and the formerly captive edge 101' is then folded over the opposite capturing edge 20" of the template member 20 to produce the multiple fold card blank depicted in FIG. 9.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications; and variations of the invention are possible in light of the above teachings. It is therefore to be understood that the invention as taught and described herein is only to be limited to the extent of the breadth and scope of the appended claims.

I claim:

1. A card folding template for use in combination with a card blank to create a properly proportioned folded card blank wherein, the card folding template comprises a generally rectangular template member fabricated from a sheet of material wherein, the interior portion of the template member is provided with at least one pair of aperture apexes which are vertically spaced from one another and aligned relative to one another and the vertical mid-line of the template member wherein, said aperture apexes are alignable with one of the edges of said card blank which is adapted to be folded over one of the edges of said rectangular template member.

2. The card folding template as in claim 1; wherein, the at least one pair of aperture apexes is disposed on the opposite ends of an elongated diamond shaped aperture.

3. The card folding template as in claim 2; wherein, the at least one pair of aperture apexes is bisected by the vertical mid-line of the template member.

4. The card folding template as in claim 1; wherein, the at least one pair of aperture apexes are individually disposed on a pair of oppositely facing triangular apertures.

5. The card folding template as in claim 1; wherein, the template member is further provided with at least one additional pair of aperture apexes which are vertically spaced from one another and aligned relative to one another, as well as, to said at least one pair of aperture apexes and the vertical mid-line of the template member.

6. The card folding template as in claim 5; wherein, at least one of said at least one pair and said at least one additional pair of aperture apexes is spaced from and disposed parallel to the vertical mid-line of the template member.

7. The card folding template as in claim 5; wherein, both said at least one pair and at least one additional pair of aperture apexes are equally spaced from and disposed parallel to the vertical mid-line of the template member.

* * * * *